United States Patent [19]

Valachovic et al.

[11] 4,349,902
[45] Sep. 14, 1982

[54] PIEZOELECTRIC TRANSDUCER FOR RECORDING VIDEO INFORMATION

[75] Inventors: John Valachovic, New Brunswick; Gerard A. Alphonse; John H. Reisner, both of Princeton; Karl-Friedrich Etzold, Hillside, all of N.J.

[73] Assignee: RCA Corporation, New York, N.Y.

[21] Appl. No.: 201,057

[22] Filed: Oct. 27, 1980

[51] Int. Cl.³ ............................................. G11B 3/32
[52] U.S. Cl. .................................. 369/132; 369/144; 369/170; 310/328
[58] Field of Search ............... 369/132, 137, 144, 170; 310/328

[56] References Cited

U.S. PATENT DOCUMENTS

| Re. 29,113 | 1/1977 | Halter | 369/144 |
|---|---|---|---|
| 3,805,100 | 4/1974 | Klemp | 369/132 |
| 3,824,352 | 7/1974 | Adler | 369/132 |
| 3,835,262 | 9/1974 | Moritz | 369/153 |
| 3,842,194 | 10/1974 | Clemens | 358/127 |
| 3,976,830 | 8/1976 | Glenn | 369/144 |
| 4,035,590 | 7/1977 | Halter | 369/144 |
| 4,044,379 | 8/1977 | Halter | 358/128.5 |
| 4,194,094 | 3/1980 | Redlich | 369/144 |

Primary Examiner—Alan Faber
Attorney, Agent, or Firm—E. M. Whitacre; J. S. Tripoli; J. E. Roehling

[57] ABSTRACT

A cutterhead assembly suitable for forming a topographic signal representative pattern in a recording media, such as a disc substrate, is constructed having a base member, a piezoelectric element and a cutting stylus. The piezoelectric element in this structure is asymmetrically assembled to the base member to reduce phase modulation of the recorded signal which would otherwise occur from the transverse motion of the stylus during the cutting operation.

9 Claims, 3 Drawing Figures

PIEZOELECTRIC TRANSDUCER FOR RECORDING VIDEO INFORMATION

This invention relates to cutterheads suitable for forming topographic signal representative patterns on a recording medium and, more particularly, to cutterheads suitable for providing a substantially uniform, signal responsive cutting stylus displacement over a relatively wide band of frequencies such as may be employed in a video disc system.

In U.S. Pat. No. 3,842,194 to J. K. Clemens, a video disc for use with a playback system of a variable capacitance type is disclosed. In one configuration of the Clemens' system information representative of recorded picture and sound is recorded in the form of a relief pattern in a relatively fine spiral groove on the surface of a disc record. For example, groove widths of approximately 2.5 micrometers and groove depths of about 0.5 micrometers may be used. During playback, capacitance variations between a conductive electrode on a stylus and a conductive property of the disc record are sensed to recover the prerecorded information.

In accordance with the Clemens' format, the video information may be recorded as relatively short (e.g., 0.6-1.6 micrometers) relief variations along the length of the spiral groove. Illustratively, the method of recording may be of a type shown in U.S. Pat. No. 4,044,379 to J. B. Halter. Pursuant to the Halter method, an electromechanically-driven stylus (e.g., of diamond) having a triangular shape, responsive to a combined video and audio signal, records relatively short geometric variations, representative of the time variations of the signal, on a surface of a metal substrate.

After the electromechanical recording operation, the geometric variations cut in the metal substrate should be a substantially faithful representation of the video and audio recording signal. Certain characteristics of the recording operation should be precisely controlled to effect this replication and thus to enhance the performance of the video disc during record playback. For example, the displacement of the cutting stylus which determines the depth of the recorded signal should be linear with applied signal voltage and independent of frequency. Further, the phase relationship between the applied signal and cutter displacement should be linear with the frequency. In the Clemens' type system the frequency band of interest may be up to 9 MHz thus requiring control over a wide range of frequencies. Of course, if the signal cutting occurs at some fraction of real time (e.g., half time) then, accordingly, the critical frequency range is reduced by this fraction.

Ideally, an electromechanical cutting stylus is excited such that it moves up and down to cut the pattern (i.e., the relief variations) of the signal along the groove. In general, the electromechanical devices used for cutting signal information over the broad bandwidth described herein have many modes of mechanical resonance which fall within the frequency band of interest. Further, the stylus may exhibit motions in directions other than the up and down signal cutting direction because of the stretching and contracting motion of the several elements of a cutter assembly as the stylus moves up and down. Due to these resonances in the driven bandwidth and contractions and stretching in their directions of motion, the stylus may be displaced such that the motiion which the sylus traces is not a substantially faithful representation of the source. Motional components in other than the driven direction and non-linear phase shifts between the displacement of the cutting stylus in the driven direction and the driving voltage can cause deleterious effects which are visable upon playback of a disc manufactured from a substrate cut with a cutterhead assembly.

In accordance with the principles of the present invention, an electromechanical transducer assembly which has a structure and composition which reduces these deleterious effects is provided.

Further, in accordance with the principles of the present invention, there is provided an apparatus for electromechanically recording signal information having a bandwidth of several megahertz along a track on a moving record medium. The apparatus includes a mounting pedestal having a cutterhead mounting surface. A base member which is coupled to the mounting surface of the mounting pedestal has a first axis of symmetry and a first surface perpendicular to the first axis. The apparatus further comprises a piezoelectric element and a cutting stylus. The piezoelectric element has a second axis of symmetry and first and second opposite parallel surfaces which are perpendicular to the second axis. The cutting stylus which is mounted to the first opposite parallel surface of the piezoelectric element has a cutting face which is perpendicular to a tangent of the track. The piezoelectric element is coupled to the base member by coupling the second opposite surface of the piezoelectric element to the first surface of the base member. The piezoelectric element is arranged on the base member in asymmetrical fashion to reduce spurious motion of the cutting stylus face along the track.

Other features and advantages of the invention will be more fully understood from the following detailed description of the preferred embodiment, the appended claims and the accompanying drawing in which:

Figure 1:
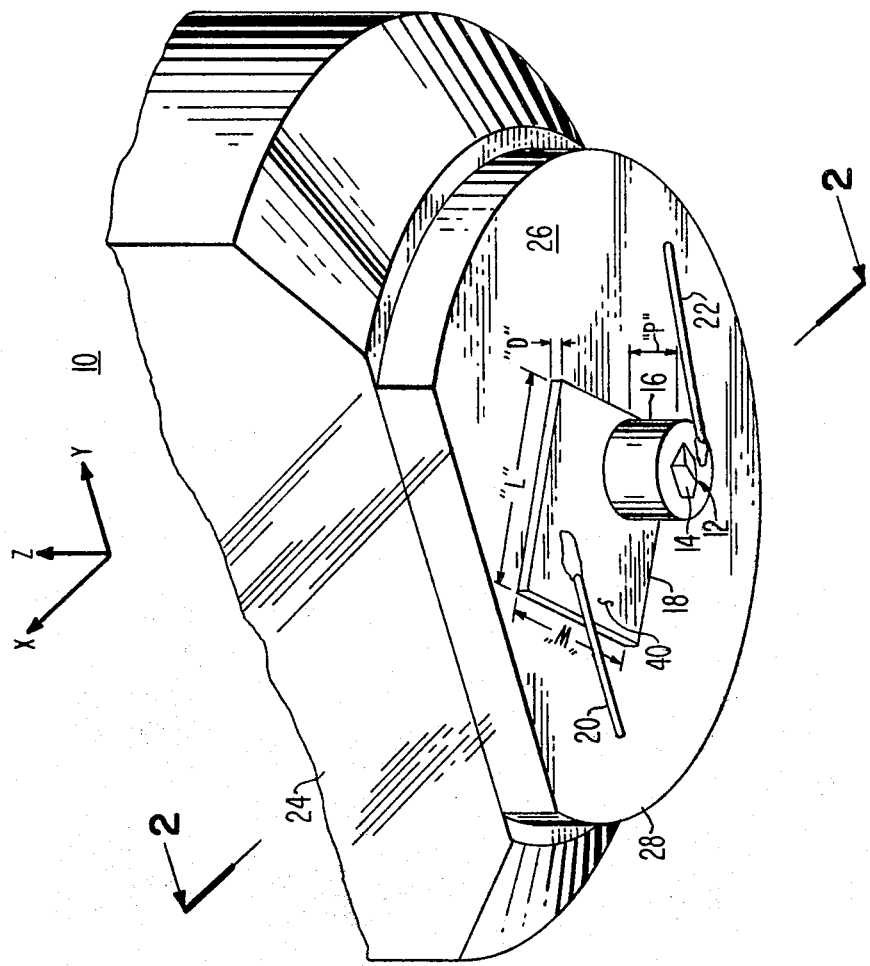
FIG. 1 is a perspective view of a video disc cutterhead constructed in accordance with the principles of the present invention.
Figure 2:
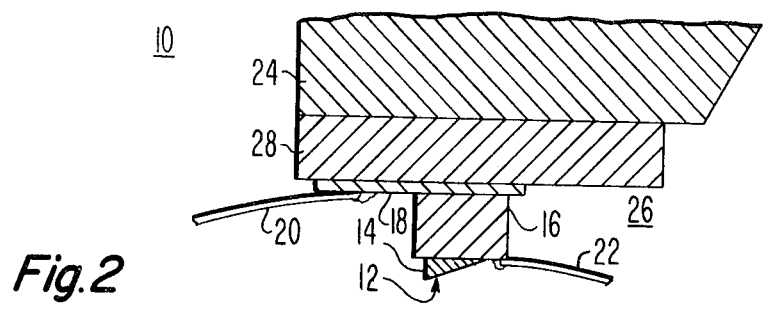
FIG. 2 is a sectional view as taken through arrows 2—2 of FIG. 1.

With reference to FIGS. 1 and 2, a cutterhead assembly 10 includes a cutting stylus 12 of a hard, rigid material (such as diamond) having a cutting face 14. Stylus 12 is mounted on piezoelectric material 16 which, in the illustrated arrangement, is of a right circular cylindrical shape. Although the piezoelectric element 16 is illustrated as a right circular cylinder, this element could take on other shapes, for example, a rectangular parallelepiped or truncated cone. The stylus 12 is rigidly attached to piezoelectric element 16, for example, by means of an epoxy cement. Typical piezoelectric materials which are suitable for element 16 are of lead zirconium titanate type and are available from Clevite Corporation as PZT-8 or PZT-4. Piezoelectric element 16 is connected to a base member 18. Typically, base member 18 may be formed of steel and joined to piezoelectric element 16 by a solder bond.

Figure 3:
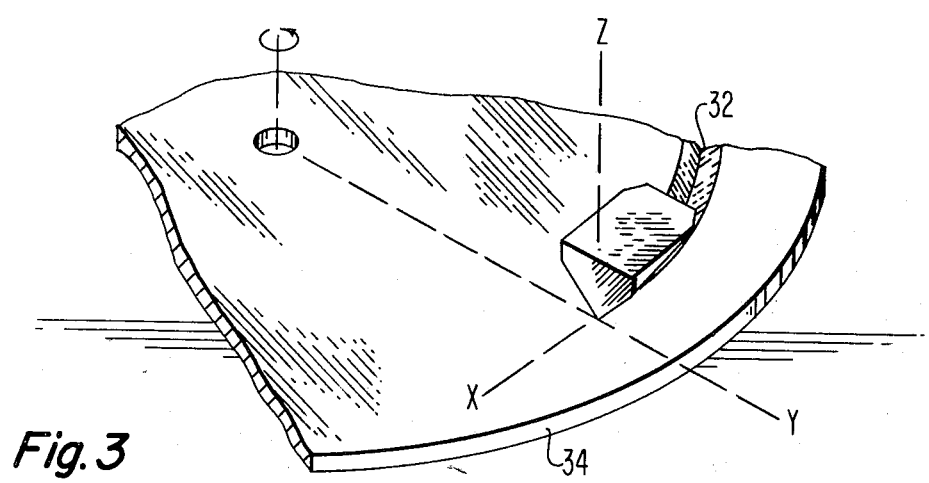
FIG. 3 is a simplified diagram of a device for mechanically recording a signal track on a video disc.

A carrier frequency, modulated with a video signal, is applied to the piezoelectric element 16 through terminals 20 and 22. Due to the signal voltage applied to the terminals 20 and 22, the length of piezoelectric element 16 varies in accordance with the modulated information so that stylus 12 performs an oscillatory motion in a direction parallel to the Z axis. Referring to FIG. 3, a track 32 having a geometric relief pattern in accordance with the information being recorded is cut in a video disc substrate 34.

Base member 18 is connected to a damping member 28 which in turn is connected to a mounting bracket 24 typically formed of a rigid material such as aluminum, steel or ceramic. Assembly 26 which includes base member 18, piezoelectric element 16 and stylus 12 is isolated from mounting bracket 24 by means of the damping member 28. Damping member 28 may include relatively thin layers of pliable material separated by layers of rigid material, such as, KAPTON available from the DuPont Corporation. The thin layers of pliable material may be of silicon rubber or cellulose nitrate highly plasticized with tricresyl phosphate. Damping member 28 essentially acts as a passive point of reference for the active assembly 26; and assures a considerable freedom of movement for assembly 26. Member 28 provides a restoring force as a result of its elasticity. If the elastic modulus of damping member 28 is chosen to be low and, therefore, its damping high, the resonances of assembly 26 can be kept below the lowest frequency limit of the useful cutter response region (e.g., below 650 KHz). If assembly 26 is tightly coupled to mounting bracket 24, a spectrum of low frequency resonances and harmonics due to the mounting bracket may appear which will cause unwanted displacements of the cutter stylus 12.

The ideal assembly 26 exhibits stylus motion only in a direction parallel to the Z axis. In actual practice X and Y components of stylus motion do exist. The Y component may generally be ignored because it effects only a small second order amplitude modulation of the Z motion or signal component. Since the recorded signal is generally FM encoded in a video disc system, the amplitude modulation is lost during demodulation of the signal during playback. The X component, however, causes a phase modulation of the recorded signal which may seriously affect reproduction of signals of short wavelength. It is felt that these transverse X, Y motions result from internal coupling due to Poisson's ratio (e.g., the contracting and stretching motion in the Z direction causes motion in the X and Y direction) in the several cutter assembly parts which have built-in or accidental physical and mechanical asymmetries in structure and materials. Under adverse mechanical circumstances the X and Y motions may equal the Z motion while, in general, they should never exceed 1/10 of the Z motion.

By careful arrangement of parts and part geometries, it has been found that the X, Y motions may be controlled over the bandwidth of interest. The X and Y motions generally are not of the same magnitude. One may be smaller than the other by several db and they may differ somewhat in frequency response. It has been found that if some small geometrical asymmetry is purposely introduced into assembly 26 the direction of motion in a plane parallel to the X—Y plane may be controlled. The asymmetry introduced may be accomplished by cutting flats on diametrically opposite sides of the cylindrical surface of the right circular cylindrical shape of piezoelectric element 16 such that the flats are perpendicular to the cylindrical base or making base member 18 asymmetrical in shape or, as is shown in the FIGURES, mounting piezoelectric element 16 asymmetrical to base member 18, such that the Z axis of piezoelectric element 16 is not collinear with the Z axis of base member 18. In the arrangement shown in FIG. 1 piezoelectric element 16 which has its symmetrical axis which is perpendicular to the cylindrical base arranged on base member 18 such that its symmetrical axis is perpendicular to and intersects a diagonal on rectangular surface 40 of base member 18.

The limiting lowest resonant frequency at the high frequency end of the cutterhead frequency response is determined by assembly 26 acting as if it were in free space. In general, the lowest strong natural resonance of either of the two elements, base and piezoelectric element, will cause the lowest strong resonance of the coupled pair. Under such circumstances the piezoelectric element mechanically excites the base such that as the frequencies of excitation are varied the base will respond to its own spectrum of resonances. The two elements are loads for one another and cause some modification of their separate responses. It should be noted that there is evidence that some lower frequency resonances may occur from the assembly acting as a unit, but generally these are low amplitude responses that may be damped to a negligible level.

In the prior art, for example Halter, the thickness of the base member is made approximately equal to the thickness of the piezoelectric element. It has been found that if the base thickness is progressively reduced a point is reached, illustratively, where the ratio of base to piezoelectric element thicknesses is approximately 1:15, where the piezoelectric element no longer excites the resonant modes of the base member. As a result, the low frequency resonance of assembly 26 is substantially the same as that of piezoelectric element 16. By choosing a thin base member the long dimensions of the base may now be disregarded with respect to their effect on the resonant frequencies. Consequently, the long dimensions may be tailored to fit the needs of mounting and isolation.

Referring to FIG. 1 base member 18 which is in the shape of a rectangular parallelepiped is shown having sides "L", "W", and "D". When "L" is equal to "W" the surface of base member 18 attached to damping member 28 is square. In the illustrative embodiment "D" is approximately one-fifteenth of length "L".

A base member having a mounting face of large area compared to the area of the mounting face of a piezoelectric element may be used to shift the center of gravity of the assembly 26 toward the base member, causing more of the free system motion to occur at the cutter where it is desired. The illustrative large area base member provides increased isolation for increased damping, more security in the mounting of the base to the damping member, suppression of some deleterious resonant modes and more space for attaching lead wires.

One principle difficulty with the triangular, pyramidal geometry of a Halter type structure is that, while some unwanted resonances are suppressed by the non-parallel sides, not all of the resonances are eliminated and the background spectrum is so complex that equalization above resonance by means of an equlizing circuit is difficult. It has been found that one approach for selecting the geometrical shape of piezoelectric element 16 is to choose a simple shape. Such a shape provides a simple resonance spectrum which may be equalized in a simpler and more complete manner. For example, a cube, rectangular parallelepiped with a square electrode face or a right circular cylinder present shapes having fairly simple resonance spectra. In systems of simple shape such as described above a taper in the Z-direction may be used to provide suppression of some of the modes that give rise to the X and Y motions without complicating the spectrum.

There may be other advantages to using rectangular or cylindrical structures for the piezoelectric element. Generally, it is desirable that the piezoelectric element exhibit its bulk properties. These properties are lost when the volume of the element is small. Further, the volume of the piezoelectric element is a measure of its physical strength and ruggedness. In this regard, the circular cross section represents relatively high volume and strength whereas the triangular cross section represents relatively low volume and strength. For example, a 0.2 mm thick (dimension "P") piezoelectric element having a resonant frequency of 5 MHz has a volume of approximately $33 \times 10^{-6}$ cm$^3$ when formed with a circular cross section, $29 \times 10^{-6}$ cm$^3$ when formed with a square cross section and $22 \times 10^{-6}$ cm$^3$ when formed with a triangular cross section. Therefore, simple geometries which have simple resonant frequency spectra may not only simplify the equalization process but also provide volume and strength to the piezoelectric element.

What is claimed is:

1. Apparatus for electromechanically recording signal information having a bandwidth of several megahertz along a track on a record medium, said apparatus comprising the combination of:
   a mounting pedestal having a mounting surface;
   a base member, coupled to said mounting surface of said mounting pedestal, having a first axis of symmetry and a first surface perpendicular to said first axis;
   a piezoelectric element having a second axis of symmetry and first and second opposite parallel surfaces perpendicular to said second axis; and
   a cutting stylus, mounted to said first opposite parallel surface of said piezoelectric elements having a cutting face, said cutting stylus being arranged on said piezoelectric element such that said cutting face is perpendicular to a tangent of said track; said second opposite surface of said piezoelectric element being attached to said first surface of said base member and said piezoelectric element being arranged on said base member in an asymmetrical fashion to reduce spurious motion of said stylus cutting face along said track.

2. The apparatus according to claim 1 wherein said base member has the geometric shape of a rectangular parallelepiped.

3. The apparatus according to claim 2 wherein said first surface of said base member has the geometric shape of a square.

4. The apparatus according to claim 3 wherein said second axis of said piezoelectric element intersects a diagonal line of said square of said first surface of said base member.

5. The apparatus according to claim 4 wherein said piezoelectric element has a geometric shape of a right circular cylinder.

6. The apparatus according to claim 5 wherein said right circular cylinder of said piezoelectric element has flats cut on the cylindrical surface, said flats being perpendicular to the ccylindrical base, said piezoelectric element being positioned such that the position of said flats reduces spurious motion of said stylus cutting face along said track.

7. The apparatus according to claim 4 wherein said piezoelectric element has the geometric shape of a rectangular parallelepiped.

8. The apparatus according to claim 1 wherein said base member has the geometric shape of a rectangular parallelepiped havine sides of length "L", "W" and "D"; wherein said "D" length is much smaller than said "L" or "W" length and wherein said side having length "D" is parallel to said first axis of said base member.

9. The apparatus according to claim 8 wherein "L" is equal to "W" and wherein the ratio of "L" to "D" is greater than 15 to 1.

* * * * *